United States Patent [19]
Copping et al.

[11] 3,723,384
[45] Mar. 27, 1973

[54] REDUCTION OF OXIDATIVE DEGRADATION AND THE CATALYSIS OF PEROXIDE DECOMPOSITION

[75] Inventors: Christopher Copping, Waltham Abbey; Norbert Uri, London, both of England

[73] Assignee: The Secretary of State for Defense in Her Britannic Majesty's Government of the United Kingdom of Great Britain and Norther Ireland, London, England

[22] Filed: Aug. 12, 1969

[21] Appl. No.: 849,399

[52] U.S. Cl..260/45.75 N, 260/45.75 R, 260/45.8 R, 260/398.5, 260/666.5
[51] Int. Cl. .........................C08f 45/62, C08g 51/62
[58] Field of Search.......260/45.75, 439, 45.8 R, 937

[56] References Cited

UNITED STATES PATENTS

| | | | |
|---|---|---|---|
| 3,004,949 | 10/1961 | Chevassus | 260/45.75 |
| 3,181,971 | 5/1965 | Raimer | 260/45.85 |
| 3,361,777 | 1/1968 | King | 260/439 |

*Primary Examiner*—Donald E. Czaja
*Assistant Examiner*—V. P. Hoke
*Attorney*—Cushman, Darby & Cushman

[57] ABSTRACT

Oxidative degradation of many organic materials, particularly polymers such as polyolefins, may be greatly reduced by the incorporation therein of certain transition metal complexes of α-dithiodiketones. These complexes can offer protection against oxidative degradation induced by many different factors including exposure of the organic materials to heat, light, ultra violet ray and gamma ray irradiation.

9 Claims, 2 Drawing Figures

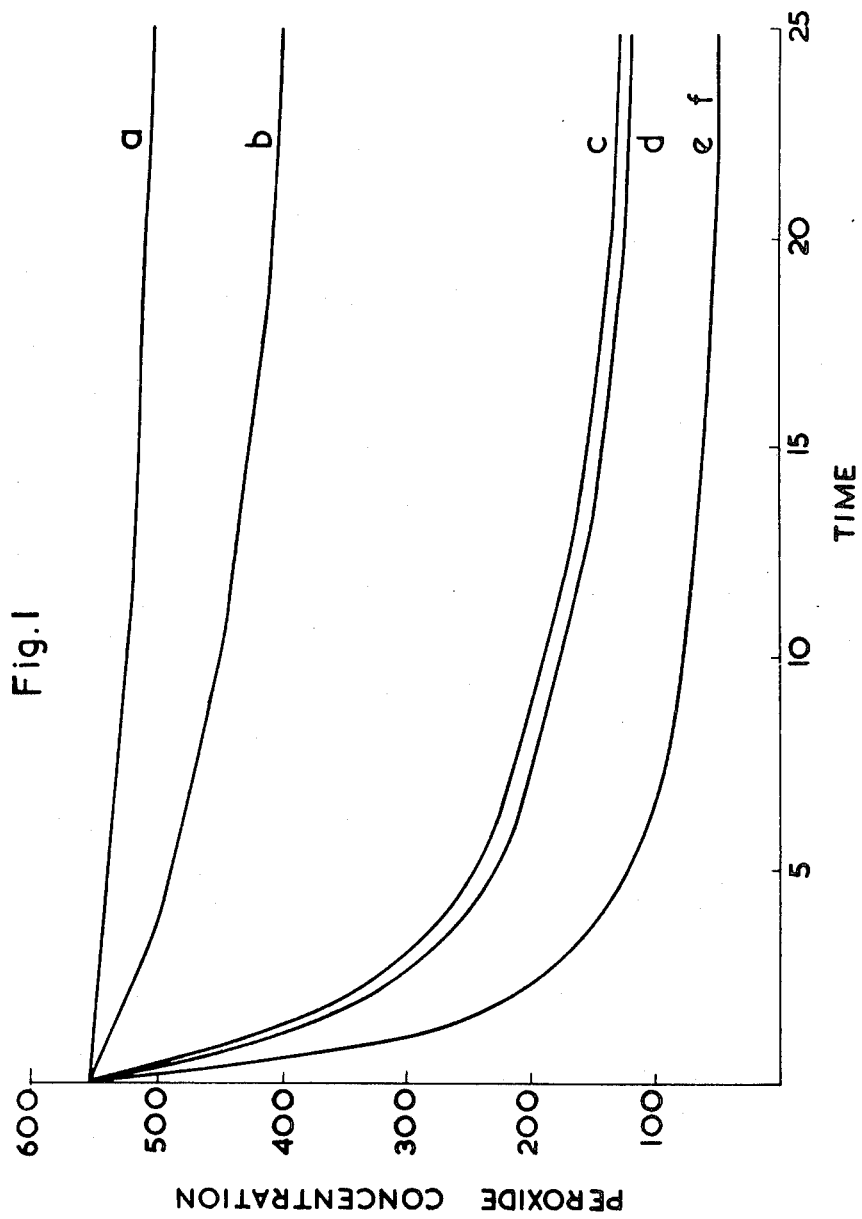

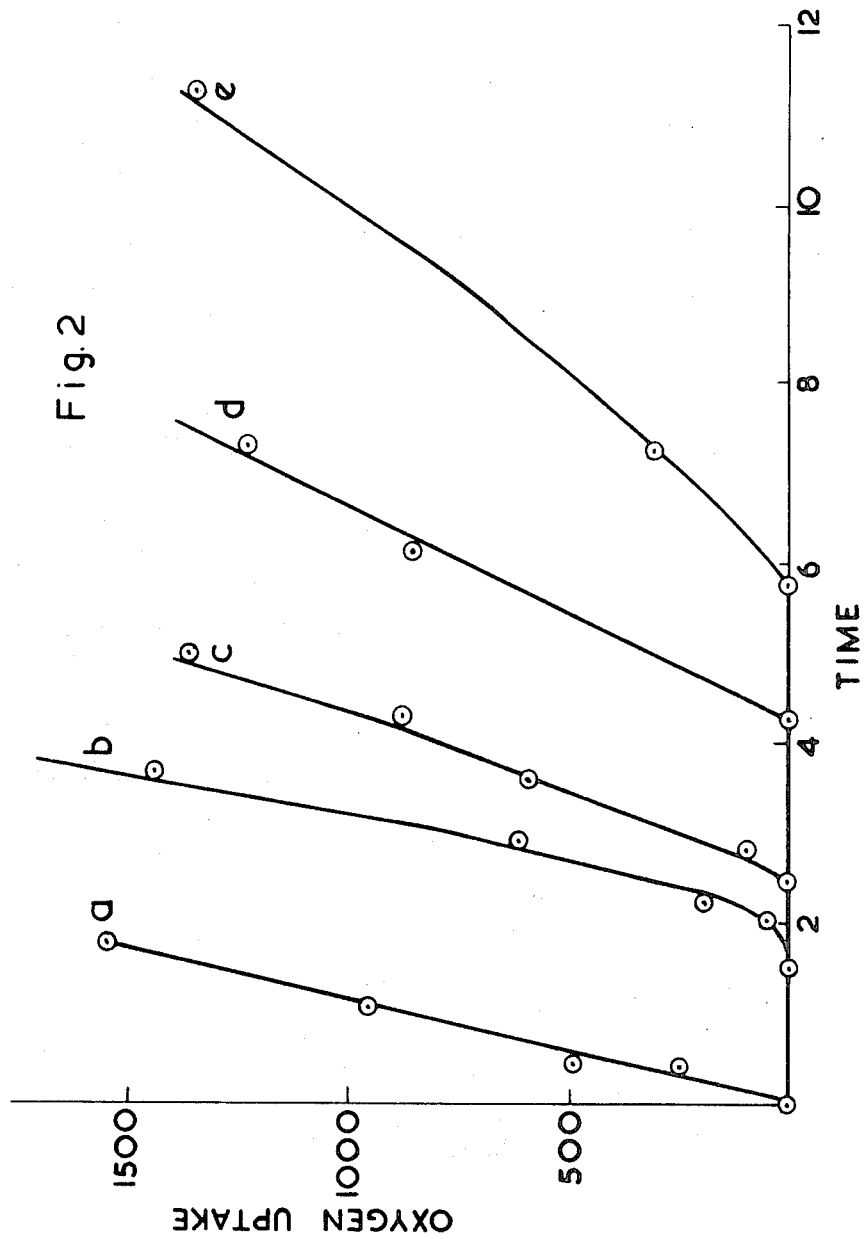

REDUCTION OF OXIDATIVE DEGRADATION AND THE CATALYSIS OF PEROXIDE DECOMPOSITION

The invention relates to improvements in the reduction of oxidative degradation in organic materials, particularly hydrocarbons and polymeric materials and also to improvements in catalysing the decomposition of peroxides (including hydroperoxides).

Oxidative degradation of organic materials, particularly polymeric materials, is a commonly observed phenomenon which can rapidly render a material useless for its intended purpose by, for example, causing discolouration or failure due to cracking and embrittlement. Oxidative degradation is believed to be caused by autoxidation reactions initiated by free radicals resulting from trace metal contamination, the action of light or ionizing radiations, decomposition of hydroperoxides via a free radical mechanism and/or direct atmospheric oxidation.

The present invention aims to reduce oxidative degradation by the introduction of an antioxidant (that is one or more substances which significantly retard the rate of autoxidation) which is both a free radical acceptor and a catalyst for the decomposition of peroxides which includes hydrogen peroxide but more particularly organic hydroperoxides, i.e., ROOH where R is an organic radical; furthermore the decomposition of the peroxide is of such a nature that it is not significantly accompanied by free radical formation leading to initiation of autoxidation. The autoxidants with which the present invention is concerned may reduce oxidative degradation caused by heat, light, ultra-violet and ionizing radiations and hydroperoxide decomposition.

According to the invention, a process for reducing oxidative degradation in an organic material, particularly a polymeric material, comprises introducing into the material an antioxidant which is an α-dithiodeketone complex having the general formula.

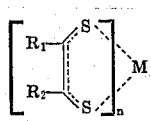

wherein $R_1$ and $R_2$ are the same or different and may be hydrogen, aliphatic (particularly $C_{1-6}$ alkyl), alicyclic particularly cyclohexyl and substituted cyclohexyl or aromatic (particularly phenyl and substituted phenyl) groups, n is 2 or 3 and M is a transition metal; or an adduct of which the α-dithiodiketone complex forms part. The transition metals as forming the most effective complexes are iron, nickel, palladium, platinum and cobalt, but for some applications a colourless zinc complex is likely to be preferable.

Adducts of the α-dithiodiketone complexes, for example with tributyl- and triphenylphosphine wherein M is selected from iron, palladium, platinum and cobalt, are often convenient in having greater solubility than the complexes per se in the organic material into which they are introduced. The thiophosphoric ester intermediate may be similarly introduced in place of the chelates themselves. Said adducts have the formula

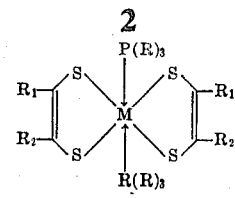

wherein M is platinum, palladium, cobalt or iron, $R_1$ and $R_2$ are as defined above and the R radicals are independently either butyl or phenyl groups.

The α-dithiodiketone complexes may be useful in protecting polymeric materials having polar groups such as polycarbonate, polyvinyl chloride, and polymethylmethacrylate, but polymeric materials in which the α-dithiodiketone complexes are particularly effective include polyolefins sensitive to oxidative degradation such as polyethylene (both branched and linear), polypropylene and copolymers thereof.

The invention thus provides improved polymeric compositions comprising at least one of the aforementioned polymeric materials incorporating an α-dithiodiketone complex as hereinbefore defined.

The concentration of α-dithiodiketone complex necessary to achieve a desired degree of protection will, of course, vary widely according to the material being protected and the conditions under which the protected material is used. Generally adequate protection is achieved by concentrations between about 0.001 and 5 percent by weight and normally concentrations at the lower end of this range would be used. For some applications (such as the production of a masterbatch of polymer containing antioxidant intended for subsequent blending with antioxidant-free polymer) higher proportions, but invariably a minor proportion by weight, may be used. An important advantage of the processes of the invention is that the protective effect of the α-dithiodiketone complexes may be retained up to very high operating temperatures. Thus, for example, the nickel complex [M = Ni, $R_1$ = $R_2$ = phenyl, n = 2, in the general formula] will yield a beneficial reduction in the oxidative degradation of polypropylene at 250°C, a temperature required for many industrial fabrication processes e.g., injection moulding. Additionally, the nickel complex will protect with a very high degree of efficiency polypropylene against oxidative degradation induced by ultra-violet radiation.

The majority of available polymeric compositions comprise many ingredients such as antistatic agents, fillers, pigments and heat stabilizers and the compounds of the present invention may be employed in conjunction with such other ingredients normally without any adverse effects. These various ingredients can be intermixed by milling, blending, extruding or any of the other conventional methods which are well-known to those skilled in the art.

Whilst particularly applicable to polyolefins, it will be appreciated that the processes of the present invention are applicable to a wide range of materials affected by oxidative degradation including other polymers, hydrocarbons and fatty acids. The processes hereinbefore described may not, however, offer significant advantages in polymeric materials having a large degree of unsaturation such as carboxy terminated polybutadienes.

Although the α-dithiodiketone complexes and adducts thereof are often extremely effective, particularly as a peroxide decomposers, we have found that combination with a conventional antioxidant produces a combined effectiveness frequently greatly in excess of the sum of the individual effectiveness of each component in the combination. In accordance with an important further feature of the invention therefore, a process for reducing odixative degradation in an organic material, particularly a polymeric material, comprises introducing into the material a synergistic combination of an α-dithiodiketone chelate (or adduct thereof) as hereinbefore defined and a conventional antioxidant. Suitable conventional antioxidants include the well-known phenolic antioxidants such as butylated hydroxayanisole (BHA) or butylated hydroxytoluene (BHT).

The α-dithiodiketone complexes may be introduced into the material to be protected by any convenient means such as incorporation into a melt or solution of the material. Where polymeric materials are to be protected it may also be possible to introduce the α-dithiodiketone complexes into a precursor of the polymeric material provided that the subsequent polymerization does not degrade the complex.

Several methods for preparing the α-dithiodiketone complexes are known, the preferred route being represented by the following two stage reaction scheme:

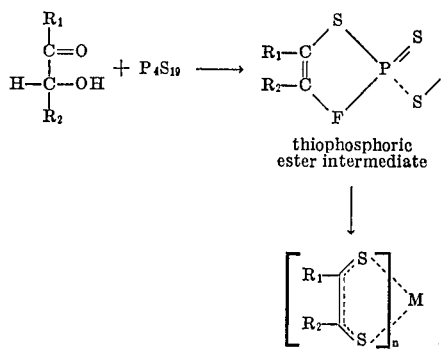

thiophosphoric ester intermediate

The effectiveness of the α-dithiodiketone complexes is clearly illustrated in the accompanying drawings in which:

FIG. 1 is a graph indicating the rate of decomposition (the concentration being stated in millimoles/litre) at 60°C of a typical peroxide, tetralin hydroperoxide, in ethyl benzoate against time (in minutes): when the tetralin hydroperoxide contained respectively no additive (curve $a$), and (M/500) of the nickel α-dithiodiketone complex ($R_1 = R_2 =$ phenyl, $n = 2$) (curve $c$), the platinum complex ($R_1 = R_2 =$ phenyl, $n = 2$) (curve $d$), the palladium complex ($R_1 = R_2 =$ phenyl, $n = 2$) (curve $e$), an equivalent adduct of triphenyl phosphine with the cobalt complex ($R_1 = R_2 =$ phenyl, $n = 2$) (curve $f$), and dilauryl thiodipropionate (DLTDP) one of the most desirable hydroperoxide decomposers known hitherto (curve $b$); and FIG. 2 is a graph of the rate of oxygen uptake (in microliters at NTP/ml substrate) against time (hours) for a system of tetralin at 60°C containing a free radical initiator (M/100) azoisobutyronitrile (AIBN) and respectively no additive (curve $a$) the nickel complex ($R_1 = R_2 =$ phenyl, $n = 2$, concentration (M/2000)) (curve $b$), the palladium complex ($R_1 = R_2 =$ phenyl, $n = 2$, (M/2,000)) (curve $c$), the nickel complex ($R_1 = R_2 =$ phenyl, $n = 2$, M/1000) (curve $d$) and the palladium complex ($R_1 = R_2 =$ phenyl, $n = 2$, (M/1,000)) (curve $e$).

FIG. 1 demonstrates that α-dithiodiketone complexes may be more effective as peroxide decomposers by at least an order of magnitude in comparison with DLTDP.

FIG. 2 demonstrates that the induction period before oxygen uptake is greatly increased in the presence of the α-dithiodiketone complexes clearly showing the effectiveness of the complexes as free radical acceptors since at this stage the hydroperoxide concentration is negligible. Similarly, the rate of oxygen uptake after the induction period is significantly reduced indicating that the complex is still active as a free radical acceptor and/or a peroxide decomposer.

A similar order of activities is obtained from complexes in accordance with the invention in which $R_1$ and $R_2$ are the same and are respectively 4-methylphenyl and 4-methoxyphenyl groups. Preliminary evidence indicates that the thiophosphoric ester intermediate (shown in the reaction scheme) also exhibits significant activity.

A typical example of the effect of α-dithiodiketone complexes in a typical polymeric material subject to oxidative degradation, high pressure polyethylene, is given in Example 1 and the synergistic effect in tetralin of an α-dithiodiketone complex in combination with a conventional antioxidant (BHA) is illustrated in Example 2. Examples 3-6 illustrate the protection against thermal degradation given by α-dithiodiketone complexes in polypropylene at high temperatures; Examples 7 and 8 illustrate the oxidative protection of particular polyethylenes Example 9 the oxidative protection in polypropylene of an α-dithiodiketone complex; Examples 10 and 11 the high temperature protection of polycarbonate; Example 12 the protection of linoleic acid; and Examples 13 and 14 the protection of polyethylene and polypropylene against ultra-violet radiation and gamma radiation respectively.

Example 1

Branched polyethylene films of approximately 0.4 g weight and 0.2 mm thickness were deposited on a platinum gauze. The films were exposed at 144°C to air in the presence of calcium oxide absorbent (previously baked at 400°-450°C) to absorb volatile matter.

A polyethylene film containing BHA (concentration M/100)) had an induction period of 5 hours before oxygen uptake began. By comparison a similar film containing a nickel dithiodiketone complex ($R_1 = R_2 =$ phenyl, $n = 2$) in a concentration of (M/1,000) had an induction period of 398 hours, showing that the complex had excellent antioxidant properties which may be due to a combination of free radical acceptor and peroxide decomposer properties possibly involving autosynergism.

Example 2

The oxygen uptake of tetralin (in the present of calcium oxide absorbent) was measured at 100°C. With no additive the induction period was negligible and with BHA (M/5,000) the induction period was 7 hours. With a nickel dithiodiketone complex additive alone ($R_1 = R_2 =$ phenyl, $n = 2$) at a concentration of (M/2,000) the induction period was less than one hour, considerably worse than BHA. However, the combination of BHA and the nickel dithiodiketone (each in the same concentration as before) produced a marked synergistic effect, giving an induction period of 30 hours.

Example 3

Polypropylene (Shell Chemicals Ltd — reactor powder KM64) contained a small proportion stabilizer which was insufficient to produce a measurable induction period (normally considered as 10 minutes or more) at 150°C before oxygen uptake occurred indicating oxidative degradation of the polymer. The commercial stabilizer was removed by soxhlet extraction with ethyl alcohol and various combinations of $\alpha$-dithiodiketone complexes and/or synergistic antioxidant combinations was then incorporated under nitrogen using a Brabender Plastograph. Powdered samples were then heated in automatic recording equipment at 150°C in air and in the presence of freshly baked calcium oxide to allow for absorption of volatiles produced as a result of the degradation of the hydroperoxide which is initially formed in the course of autoxidation. The results are summarized in the following table.

| *Additive | Concentration in gram moles/kilogram of polypropylene | Approximate weight percentage | Length of Induction Period in hours |
|---|---|---|---|
| None | - | - | Negligible |
| Commercial Antioxidant in KM 64 | Unknown | Unknown | Negligible |
| BHT+DLTDP | 1/50+1/50 | 0.4%+1% | 12 |
| Antioxidant 2246+DLTDP | 1/100+1/100 | 0.3%+0.5% | 236 |
| NiSDT | 1/500 | 0.1% | 521 |

A negligible induction period in this context means induction period of less than 20 minutes which cannot be established with any degree of certainty. * BHT = 2, 6 di-t-butyl-p-cresol; DLTDP = 3,3'-dilauryl thiodipropionate; Antioxidant 2246 = 2,2'-methylene bis(4-methyl-6-t-butylphenol); NiSDT = bis(stilbenedithiolate) nickel (II) [M = Ni, $R_1$ = $R_2$ = phenyl, $n = 2$].

The concentration of nickel complex can be increased to M/50 (approximately 1 percent). This should, however, rarely be necessary. With M/200 NiSDT the experiment was stopped after 600 hours but in general it was found that induction periods were proportional to the inhibitor concentration so that the expected induction period for M/200 NiSDT (approximately 0.25 percent) would be well in excess of 1,000 hours at 150°C.

Example 4

The experimental conditions and preparation of sample were identical with those given in Example 3 except that the temperature at which the test was carried out was raised from 150° to 200°C. A polymer containing M/200 NiSDT (approx. 0.25 percent) had an induction period of 21 hours whilst a polymer containing the well known commercial synergistic combination of M/100 Antioxidant 2246 and M/100 DLTDP (approx. 0.3 percent and 0.5 percent respectively) had an induction period of 8 hours only.

A further comparison at 200°C between polypropylene containing a recognized stabilizer against ultra-violet radiation ((M/200) concentration of Negopex A, a nickel ketoxime complex manufactured by I.C.I. Ltd.) and polypropylene containing the same concentration of NiSDT gave a negligible induction period for Negopex A compared with a 21-hour induction period for NiSDT.

Example 5

Propathene CM10 (polyethylene/polypropylene copolymer produced by I.C.I.) was subjected to atmospheric oxidation at a temperature of 200°C. In the absence of any antioxidant the induction period was negligible. In the presence of a powerful synergistic combinations, i.e., Antioxidant 2246 (at a concentration of M/100) and DLTDP (at a concentration of M/100) the induction period prior to oxygen uptake was found to be 6 hours. When this powerful synergistic combination was replaced by NiSDT (at a concentration of M/200) the induction period which was observed, prior to oxygen uptake, under the same experimental conditions, was found to be 14 hours.

Thus, in the presence of NiSDT, the induction period was increased more than twofold, although the concentration of total inhibitor was significantly lower with NiSDT than with the synergistic combination.

Example 6

The following table demonstrates the effectiveness of the alpha-dithioketone chelate at 250°C. This temperature is required in certain processing techniques (e.g., injection moulding) and it is normally considered desirable that the induction period should exceed 30 minutes under these extreme conditions of processing to provide a reasonable safety margin.

| Additive | Concentration in gram moles/ kilogram of polymer | Approximate weight percentage | Length of Induction Period in minutes |
|---|---|---|---|
| None | - | - | Negligible |
| BHT | M/200 | .1% | Negligible |
| Antioxidant 2246+DLTDP | M/100+M/100 | 0.3%+0.5% | 10 |
| NiSDT | M/200 | 0.25% | 50 |
| NiSDT | M/50 | 1% | 170 |

Bis (stilbenedithiolate) nickel (II) thus provides a very adequate safety margin against oxidative degradation of polypropylene at processing temperatures of 250°C and for most practicable purposes a concentration of 0.25 percent would be quite sufficient although a further increase in stability is achievable by increasing the nickel chelate concentration to a level of 1 percent. With the composition quoted in the last line of the table there was no measurable carbonyl formation after periods of 50 and 90 minutes respectively, thus confirming the validity of the length of induction period which was based on measurement of oxygen uptake.

Example 7

Films of a linear polyethylene were deposited on platinum gauze as in the case of branched polyethylene of Example 1.

With $M/200$ the induction period at 150°C ascertained was 7 hours whereas in the presence of $M/200$ NiSDT (0.25 percent) the induction period was in excess of 500 hours.

Example 8

Films of a linear polyethylene were prepared as in Example 1. In the presence of $M/200$ BHA (approx. 0.1 percent) the induction period at 200°C was found to be negligible whereas in the presence of $M/200$ NiSDT (approx. 0.25 percent) the induction was ascertained as 45 hours.

Examples 3 and 8 clearly indicate that the α-dithiodiketone chelates can be significantly superior to conventional phenolic antioxidants at elevated temperatures and would be expected not only to be useful inhibitors for storage purposes but would also prevent oxidative degradation when processing requirements are severe.

Example 9

Polypropylene films of less than 0.4 mm thickness were irradiated with a UVS—500 Hanovia arc in specially made Pyrex Warburg flasks.

After 70 hours the film containing $M/200$ NiSDT showed no measurable oxygen uptake whilst one containing no antioxidant showed oxygen uptake of approximately 14 ml./g. and one containing $M/100$ Antioxidant 2246 and $M/1,100$ DLTDP showed oxygen uptake of approximately 4 ml./g.

NiSDT has therefore the additional advantage of acting simultaneously as thermal and light stabilizer with a high degree of efficiency. Oxygen uptake measurements 2by determining the concentration of carbonyl groups by means of infra-red spectrophotometry. It was shown that carbonyl formation was a linear function of oxygen uptake and again it was noteworthy that the sample containing $M/200$ NiSDT showed no measurable carbonyl formation.

Example 10

A polycarbonate ("Makrolon" from Bayer A.G. Leverkusen) film of 0.2 mm thickness containing no antioxidant was cast from $CH_2 Cl_2$ solution; the polymer had been purified by precipitation of a chloroform solution with di-ethyl ether.

At 200°C it had no measurable induction period whereas a similar film containing $M/200$ NiSDT showed an induction period of approximately 16 hours.

Example 11

A similar polycarbonate film containing $M/200$ NiSDT was exposed at a temperature of 140°C for a period of 250 hours. There were no signs of any oxygen uptake or discolouration and the relative viscosity of 1 percent solutions, using $CH_2Cl_2$ as a solvent, was found to be unchanged within the limits of the experimental error at 1.74 ($t = 25°C$) notwithstanding the prolonged exposure.

Example 12

Freshly vacuum-distilled 99 percent linoleic acid (koch-Light) was found to have an induction period of 30 minutes at a temperature of 50° C. When the same linoleic acid was saturated with NiSDT (approx. $M/3,000$) the induction period increased to 8 hours at 50°C.

Example 13

The comparative stabilities of polyolfin samples against ultra-violet radiation was measured by following carbonyl formation with infra-red spectrophotometry. For this purpose it was assumed that the molar absorbance for the carbonyl band at 5.85 $\mu$ amounted to 160. The latter value is an empirical average necessitated by the fact that any carbonyl formed is present in at least three different forms, i.e., aldehyde, ketone and carboxylic acid. In all the photochemical determinations all the wavelengths transmitted by 2 mm. of Pyrex glass were utilized to irradiate 0.2 mm. thick polymer films using a Hanovia UVS-500 arc source. For the comparison of light intensity actinometric measurements were carried out for the 365 m $\mu$ band; the absorbed intensity of the latter was ascertained as $2 \times 10^{-4}$ Nhδ/hour.

The results were as follows:

| Polymer | Additive | Length of irradiation in hours | Gram-moles carbonyl per kg polymer |
|---|---|---|---|
| Polypropylene | None | 90 | 0.20 |
| do. | M/100 Antioxidant 2246+M/100 DLTDP | 90 | 0.06 |
| do. | M/200 NiSDT | 280 | Nil |
| do. | M/200 PdSDT | 144 | 0.09 |
| do. | M/200 DOBP | 40 | 0.015 |
| do. | 0.027% (=approx. M/1300)Negopex A | 40 | 0.03 |
| do. | 0.027% (=approx M/2000) NiSDT | 40 | Nil |
| Linear Polyethylene | None | 144 | 0.09 |
| do | M/200 NiSDT | 280 | Nil |
| Branched (High pressure Polyethylene | None | 144 | 0.09 |
| do. | M/200 DHBP | 75 | 0.015 |
| do. | M/200 NiSDT | 200 | Nil |
| polyethylene Polypropylene Copolymer | None | 40 | 0.06 |
| do. | M/200 NiSDT | 40 | Nil |

DOBP = 2-dodecyl,4-hydroxybenzophenone
DHBP = 2,4-dihydroxybenzonphenone

The effectiveness of the additives of the present invention particularly NiSDT, is clearly apparent. The limit of carbonyl detection in the table is 0.003.

Example 14

The effectiveness of the antioxidants of the present invention in affording protection against ionizing radiations was assessed by gamma ray irradiation of samples of polyethylene and polypropylene respectively in film (0.1 – 0.2 mm thick) and powder form.

When antioxidant-free polypropylene was irradiated in powder form over a period of 66 hours and received a dose of approximately 20 Megarads, the physical properties deteriorated to such an extent that it was impossible to press the powder into a film for carbonyl determination by means of infra-red spectrophotometry. When polypropylene containing $M/200$ NiSDT was exposed to gamma rays under identical conditions, it was possible to press the material into film of 0.2 mm thickness which was found to contain $3 \times 10^{-2}$ gram-moles carbonyl per kg polypropylene. With linear polyethylene containing no antioxidant the carbonyl concentration was 0.13 g-moles carbonyl/kg polyethylene after exposure to a dose of 7 Megarads; with the same polymer in the presence of $M/200$ NiSDT the concentration of carbonyl under otherwise identical conditions of exposure was found to be 0.05 g-moles carbonyl/kg polyethylene. With branched polyethylene the corresponding figures (for a 7 Megarad dose) were 0.06 g-moles carbonyl/kg in the absence of antioxidant, and 0.03 g-moles carbonyl/kg polyethylene in the presence of $M/200$ NiSDT, respectively.

It will be appreciated that in addition to affording protection against unavoidable ionizing radiation, the antioxidant of the present invention may usefully be incorporated in polymeric materials which are deliberately subjected to ionizing radiation to achieve cross-linking, for example, ethylene-propylene copolymers containing some conjugated dienes. Sufficient antioxidant will normally remain after irradiation to achieve useful protection against thermal and ultraviolet-induced oxidative degradation.

We claim:

1. A polymeric composition comprising a polymeric material selected from the polymer classes consisting of polyolefins and polar polymers having incorporated therein an effective proportion of an antioxidant selected from the group consisting of (1) an α-dithiodiketone complex having the general formula:

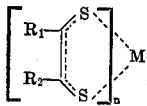

wherein $R_1$ and $R_2$ are independently selected from the group consisting of hydrogen, aliphatic, alicyclic and aromatic groups $n$ is 2 or 3 and M is a transition metal (2) an adduct represented by the formula

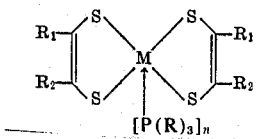

wherein $R_1$ and $R_2$ are as defined above, R is either butyl or phenyl, $n$ is 1 or 2 and $M_1$ in said complex is selected from the group consisting of platinum, palladium, cobalt and iron.

2. A polymeric composition according to claim 1 wherein the polymeric material is a polyolefin selected from the group consisting of polyethylene, polypropylene and copolymers of polyethylene and polypropylene.

3. A polymeric composition according to claim 1 wherein the polymeric material is polycarbonate, polymethyl methacrylate or polyvinyl chloride.

4. A polymeric composition according to claim 1 wherein the proportion of antioxidant is between about 0.001 and 5 percent by weight.

5. A polymeric composition according to claim 1 wherein the transition metal M is nickel.

6. A polymeric composition according to claim 1 wherein the transition metal M is zinc.

7. A polymeric composition according to claim 1 wherein the transition metal M is selected from the group consisting of iron, palladium, platinum and cobalt.

8. A polymeric composition according to claim 1 wherein $R_1$ or $R_2$ is selected from the group consisting of $C_1$ to $C_6$ alkyl group, cyclohexyl, substituted cyclohexyl, phenyl and substituted phenyl.

9. A polymeric composition comprising a polymeric material selected from the polymer classes consisting of polyolefins, polycarbonates, polyvinyl chloride and polymethacrylates having incorporated therein an effective proportion of an antioxidant selected from the group consisting of (1) and α-dithiodiketone complex having the general formula:

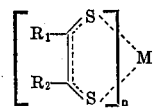

wherein $R_1$ and $R_2$ are independently selected from the group consisting of hydrogen, aliphatic, alicyclic and aromatic groups, $n$ is 2 or 3 and M is a transition metal and (2) an adduct represented by the formula

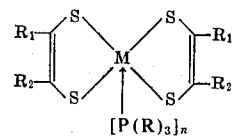

wherein $R_1$ and $R_2$ are as defined above, R is either butyl or phenyl, $n$ is 1 or 2 and $M_1$ in said complex is selected from the group consisting of platinum, palladium, cobalt and iron.

* * * * *